Feb. 14, 1967 H. B. SHARP 3,304,361

OVERHEAD LINE EQUIPMENT MOUNTING DEVICE

Filed Sept. 17, 1965 3 Sheets-Sheet 1

Inventor
Harold B. Sharp
By
Wenderoth, Lind & Ponack
Attorneys

Inventor
Harold B. Sharp
By Wenderoth, Lind & Ponack
Attorneys

Feb. 14, 1967 H. B. SHARP 3,304,361

OVERHEAD LINE EQUIPMENT MOUNTING DEVICE

Filed Sept. 17, 1965

3 Sheets-Sheet 3

Inventor
Harold B. Sharp
By
Wenderoth, Lind & Ponack
Attorneys

United States Patent Office 3,304,361
Patented Feb. 14, 1967

3,304,361
OVERHEAD LINE EQUIPMENT MOUNTING DEVICE

Harold Bremner Sharp, 12 Mundy Ave., Howardene, Durban, Natal, Republic of South Africa Filed Sept. 17, 1965, Ser. No. 488,213
Claims priority, application Republic of South Africa, Sept. 25, 1964, 4,571/64
4 Claims. (Cl. 174—44)

This invention relates to an overhead line equipment mounting device for overhead telecommunications and power lines.

According to the invention, an overhead line equipment mounting device comprises a platform of electrical insulating material; a cover having engaging means adapted to engage with the platform, there being defined between the platform and the cover a space within which overhead line equipment is receivable; connecting means for providing electrical conducting paths through the platform into and out of the defined space; mounting means for mounting the cover and platform assembly close to overhead line conductors and including a metal member fast with the platform and projecting below it; and a shield of electrical insulating material between the metal member and the connecting means, the shield being fast with the underside of the platform and depending below it to such an extent that it interrupts the direct line between the metal member and the connecting means.

The shield may be in the form of a skirt integral with the platform and extending at least partially around the metal member.

The mounting means may include an arm having means for securing it at its one end to the metal member in such a way that it extends transversely from the axis of the metal member away from the shield, and may have means at its other end for securing it to a post supporting an overhead line conductor.

The connecting means may include a plurality of metal posts embedded in spaced relationship in the platform and projecting above and below it. Means may be provided for connecting the lower ends of the posts to electrical conductors. There may be provided an electrically conducting bridge-piece receivable within the defined space for engaging with the upper ends of the two posts and for electrically bridging the gap between them.

The posts may conveniently be arranged in a plurality of pairs, and may have cranked upper ends. The posts may be arranged in such a way that the lateral spacing between their cranked upper ends is less than the lateral spacing between their lower ends. In this arrangement the bridge-piece may be in the form of a removable saddle-like clip adapted to clip onto the upper ends of the posts to establish electrical contact between them.

There may be provided upstanding lips fast with and projecting upwardly from the upper surface of the platform and around the upper ends of the posts, and partitions integral with and extending upwardly from the upper surface of the platform, may be provided between the upper ends of adjacent pairs of posts.

The invention will now be described with reference to the accompanying drawings in which a particular embodiment of the invention is shown by way of example.

Figure 1:
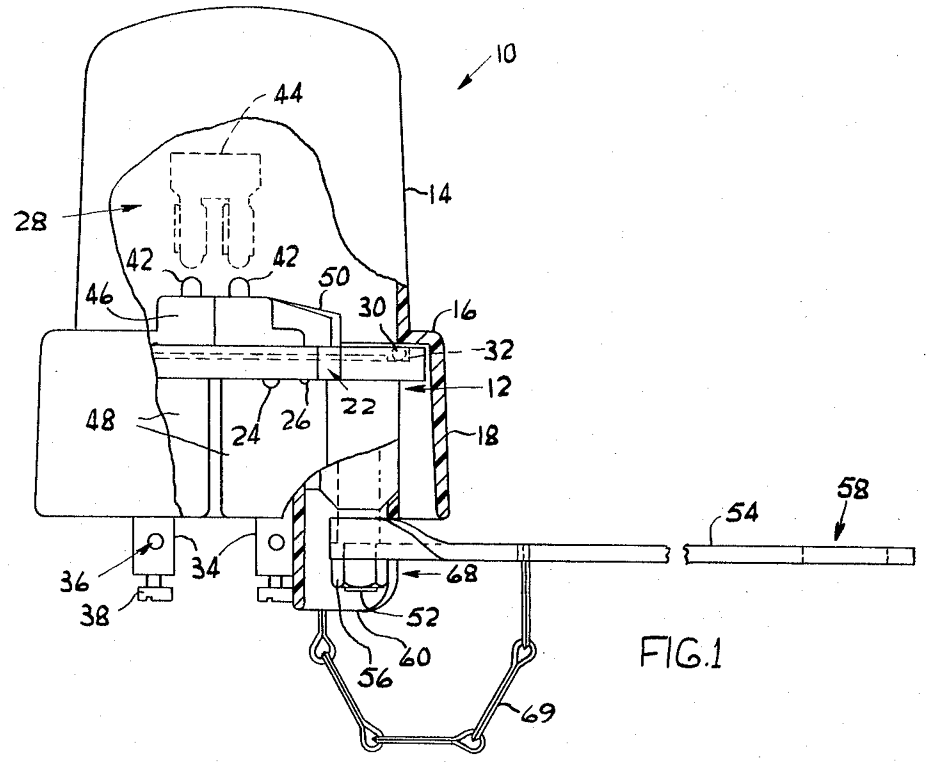
FIGURE 1 shows a part-sectional side view of an overhead line equipment mounting device in assembled position.
Figure 2:
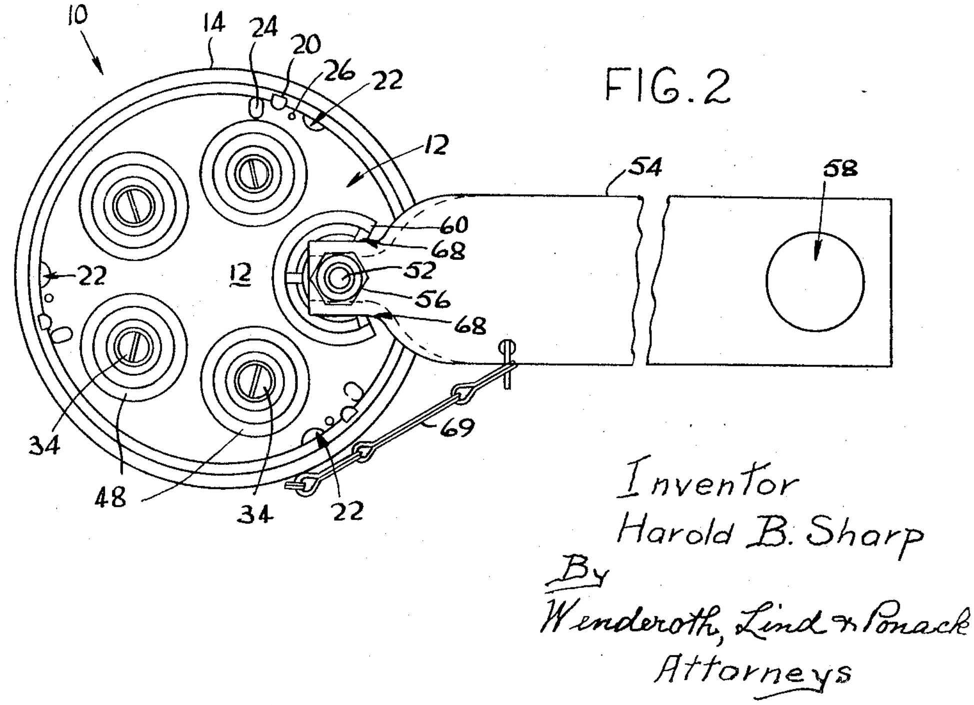
FIGURE 2 shows a bottom view of the device shown in FIGURE 1.
Figure 3:
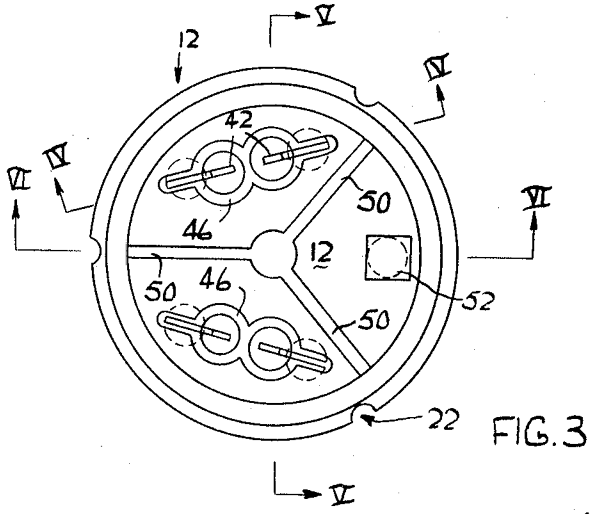
FIGURE 3 shows a plan view of the platform of the device shown in FIGURE 1.
Figure 4:
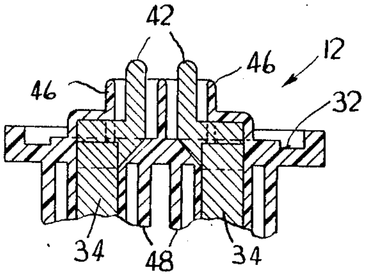
FIGURE 4 shows a section taken on line IV—IV of FIGURE 3.
Figure 5:
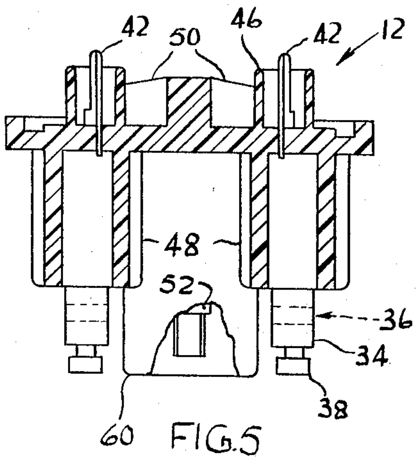
FIGURE 5 shows a section taken on line V—V of FIGURE 3.
Figure 6:
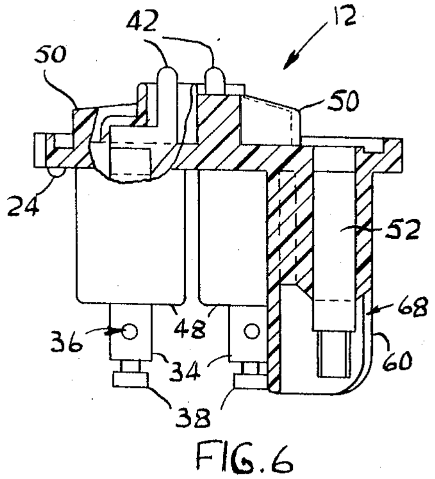
FIGURE 6 shows a section taken on line VI—VI of FIGURE 3.

Referring to FIGURES 1 and 2 of the drawings, there is shown an overhead line equipment mounting device indicated generally by reference numeral 10 which includes a platform 12 of electrical insulating material and a cover 14 which is adapted to engage in bayonet-fashion with the platform 12.

The cover 14 has a stepped region 16 and a skirt 18 extending downwardly around the cover for weatherproofing of the underside of the platform 12. On the inner periphery of the skirt 18 there are provided a plurality of circumferentially spaced, inwardly projecting formations 20 which are adapted to co-operate bayonet-fashion with a plurality of circumferentially spaced indentations 22 which are provided along the periphery of the platform 12. Angularly spaced from each indentation 22 there are provided two stops 24 and 26 against which the formation 20 is capable of abutting for maintaining the cover 14 in a closed position on the platform 12. The stop 26 of a relatively small dimension so that the formation 20 can be forced over this stop when it is desired to remove the cover from the platform.

In order to weatherproof the space 28 which is defined between the cover 14 and the platform 12, there is provided a ring 30 of resilient material such as rubber or synthetic plastic material. When the cover is in a closed position on the platform, the ring 30 is compressed between the stepped region 16 of the platform 14 and an annular groove 32 which is recessed into the platform 12. In addition to providing a sealed joint between the cover 14 and the platform 12, the resilient ring 30 is advantageous in forcing the platform 12 into locked engagement against the formations 20 when the lid is in a closed position on the platform.

Figure 7:
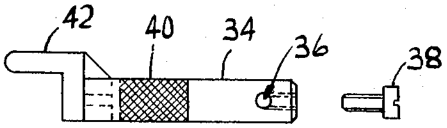
FIGURE 7 shows a side view of a cranked metal post provided in the device shown in FIGURE 1.

In the platform 12 there are embedded a plurality of metal posts 34 in spaced relationship and projecting above and below it. The metal posts 34 have apertures 36 in their lower regions in which electrical conductors are receivable, and screws 38 are provided for clamping the conductors in the apertures 36. Referring more particularly to FIGURE 7 of the drawings, the metal post 34 is shown to have a knurled region 40 to facilitate securing of the metal post to the platform 12. Each metal post 34 has a cranked upper end 42. The metal posts 34 are arranged in a plurality of pairs, and the arrangement of the posts is such that the lateral spacing between their cranked upper ends 42 is less than the lateral spacing between their lower ends.

An electrically conducting bridge-piece in the form of a removable saddle-like clip 44 is receivable within the defined space 28 and is adapted to clip onto the upper ends 42 of the posts 34 to establish electrical contact between the posts.

Around each metal pot 34 there is provided an upstanding lip 46 fast with and projecting upwardly from the upper surface of the platform 12 and around the upper ends 42 of the posts. There are further provided around each metal post 24 a depending skirt 48 fast with and depending below the platform 12. The lips 46 and the skirt 48 are advantageous in providing long leakage paths between the metal posts 34.

At the upper surface of the platform 12 there are provided a plurality of partitions 50 integral with and extending upwardly from the upper surface of the platform for partitioning the platform into a plurality of compartments. In some of the compartments pairs of upstanding lips 46 around the cranked end parts 42 of the metal posts 34, may be arranged.

Mounting means are provided for mounting the cover 14 and the platform 12 in an assembled form close to overhead line conductors. The mounting means include a metal member 52 embedded in the platform 12 and projecting below it, and an arm 54 mounted on the metal member 52 in such a way that it extends transversely from the metal member for supporting the device in cantilever fashion on a support post. The arm 54 has an aperture in one of its ends in which the metal member 52 is receivable, and a nut 56 is provided for securing the arm 54 to the metal member 52. At the other end of the arm 54 an aperture 58 is provided by means of which the arm may be secured to a post supporting an overhead line conductor.

Figure 8:
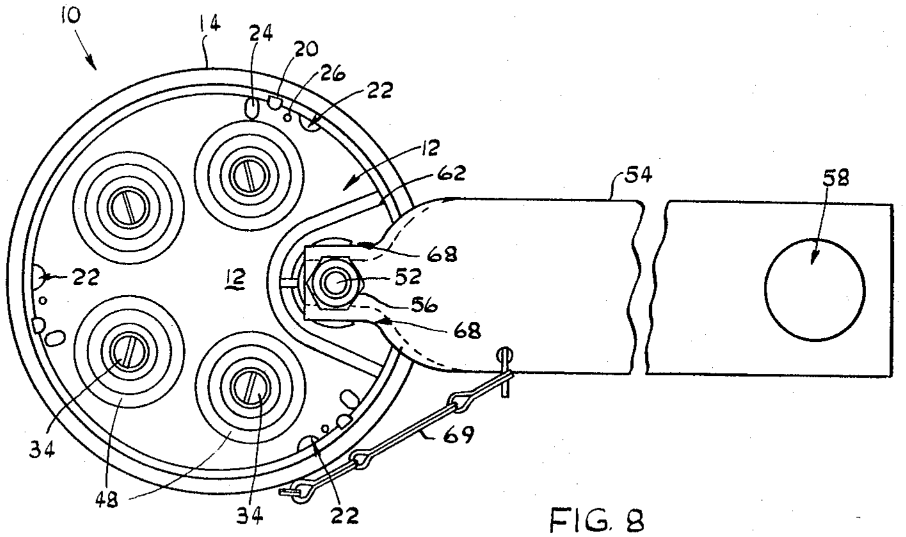
FIGURE 8 shows a plan view of an alternative platform to that shown in FIGURE 3.

A shield 60 of electrically insulating material is provided between the metal member 52 and the metal posts 34, the shield being fast with the underside of the platform and depending below it to such an extent that it interrupts the direct line between the metal member and the metal posts. In one arrangement, the shield 60 may be a continuous skirt extending around the metal member 52, or the shield may be in the form of a continuous skirt extending around each metal post 34, the skirt being similar to, but longer than, the skirt 48 shown in the drawings. In an alternative construction, as shown in FIGURE 8 of the drawings, the shield may be in the form of a half-skirt 62 extending partly around the metal member 52.

In order to prevent the cover 14 from being lost, when it is detached from the platform 12, a chain 69 is provided which is secured to the arm 54 and to the cover.

In use, the shield 60, 62, shields the metal member 52 from the metal posts 34 and prevents electrical conducting paths being established between the metal member 52 and the cranked end parts 42 inside the space 28.

The platform 12, the lips 46, the skirts 48, the partitions 50 and the shield 60, 62, may conveniently be moulded as an integral unit from electrical insulating synthetic plastic material. The metal posts 34 and the metal member 52 may be embedded in the platform 12 during the moulding process.

In the shield 60 there is conveniently provided an opening 68 through which the arm 54 is permitted to extend transversely to the metal member 52.

I claim:

1. An overhead line equipment mounting device comprising a platform of electrical insulating material; a cover having engaging means engaging said platform with a space between said platform and cover within which overhead line equipment is receivable; connecting means providing electrical conducting paths through said platform into and out of said space; mounting means mounting said cover and platform assembly close to overhead line conductors including a metal member fast with said platform and projecting below it; and a shield of electrical insulating material between said metal member and said connecting means, said shield being in the form of a skirt integral with said platform and extending at least partially around said metal member and depending from the underside of said platform so that it interrupts the direct line between said metal member and said connecting means.

2. A device according to claim 1, in which said mounting means includes an arm having means for securing it at one end to said metal member so that it extends transversely from the axis of said metal member away from said shield, and having means at its other end for securing it to a post supporting an overhead line conductor.

3. A device according to claim 1, in which said connecting means includes a plurality of metal posts embedded in spaced relationship in said platform and projecting above and below it, means connecting the lower ends of said posts to electrical conductors, and in which an electrically conducting bridge-piece in the form of a removable saddle-like clip is receivable within said space engaging the upper ends of two posts electrically bridging the gap between them.

4. A device according to claim 3, in which said posts are arranged in a plurality of pairs having cranked upper ends so that the lateral spacing between their cranked upper ends is less than the lateral spacing between their lower ends.

References Cited by the Examiner

UNITED STATES PATENTS

| | | | |
|---|---|---|---|
| 461,195 | 10/1891 | Dillon | 174—81 |
| 1,786,765 | 12/1930 | Marbury | 174—59 |
| 3,196,202 | 7/1965 | Sharp | 174—44 |

FOREIGN PATENTS

| | | |
|---|---|---|
| 108,973 | 2/1928 | Austria. |
| 717,857 | 10/1931 | France. |
| 1,099,174 | 3/1955 | France. |

LARAMIE E. ASKIN, *Primary Examiner.*